US012236251B2

(12) United States Patent
Schimon et al.

(10) Patent No.: US 12,236,251 B2
(45) Date of Patent: *Feb. 25, 2025

(54) DECLARATIVELY DEFINED USER INTERFACE TIMELINE VIEWS

(71) Applicant: Apple Inc., Cupertino, CA (US)

(72) Inventors: David A. Schimon, San Francisco, CA (US); August L. Joki, Campbell, CA (US); Joshua C. Weinberg, Campbell, CA (US); Matthew S. Koonce, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,875

(22) Filed: Sep. 11, 2023

(65) Prior Publication Data

US 2023/0418629 A1     Dec. 28, 2023

Related U.S. Application Data

(63) Continuation of application No. 17/879,724, filed on Aug. 2, 2022, now Pat. No. 11,789,755, which is a
(Continued)

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06T 11/60* (2013.01); *G06T 13/80* (2013.01);
(Continued)

(58) Field of Classification Search
CPC ........ G06F 3/0482; G06F 9/451; G06T 11/60; G06T 13/80
See application file for complete search history.

(56) References Cited

U.S. PATENT DOCUMENTS 5,337,258 A      8/1994   Dennis
5,809,266 A *    9/1998   Touma ................. G06F 16/248
                                          715/764

(Continued)

FOREIGN PATENT DOCUMENTS

WO    WO 2018/209152    11/2018

*Primary Examiner* — Seth A Silverman
(74) *Attorney, Agent, or Firm* — BAKERHOSTETLER

(57) ABSTRACT

A device implementing a system to render user interface timeline views for display of dynamic application content includes a processor configured to retrieve a data structure corresponding to user interfaces of an application associated with respective times, and at least one declaratively defined user interface element. The processor is further configured to determine whether a rendering cost of a plurality of the user interfaces complies with an update budget of the application, where the rendering cost includes interpreting the at least one declaratively defined user interface element for the respective times. When the rendering cost is determined to comply, the processor is further configured to render the plurality of the user interfaces in advance of the respective times associated with the plurality of the user interfaces. The processor is further configured to display at least one of the rendered plurality of the user interfaces based on a current time.

20 Claims, 8 Drawing Sheets

Related U.S. Application Data continuation of application No. 17/123,031, filed on Dec. 15, 2020, now Pat. No. 11,403,119.

(60) Provisional application No. 63/041,995, filed on Jun. 21, 2020.

(51) Int. Cl.
 *G06T 11/60* (2006.01)
 *G06T 13/80* (2011.01)
 *H04L 67/75* (2022.01)

(52) U.S. Cl.
 CPC ...... *G06T 2200/16* (2013.01); *G06T 2210/64* (2013.01); *H04L 67/75* (2022.05)

(56) References Cited

U.S. PATENT DOCUMENTS

| | | |
|---|---|---|
| 10,740,404 B1 | 8/2020 | Hjemstad |
| 2005/0216883 A1 | 9/2005 | Ishimitsu |
| 2007/0234195 A1* | 10/2007 | Wells .................. G06F 16/9577 |
| | | 715/205 |
| 2011/0119100 A1 | 5/2011 | Ruhl |
| 2011/0126140 A1 | 5/2011 | Danilov |
| 2014/0366042 A1 | 12/2014 | Chan |
| 2018/0150443 A1* | 5/2018 | Singleton .............. H04L 67/306 |
| 2019/0342252 A1* | 11/2019 | Dascola ................ G06F 3/0481 |
| 2020/0380926 A1 | 12/2020 | Douglas et al. |

\* cited by examiner

DECLARATIVELY DEFINED USER INTERFACE TIMELINE VIEWS

CROSS REFERENCE TO RELATED APPLICATIONS

This application is a continuation of U.S. patent application Ser. No. 17/879,724, entitled "Declaratively Defined User Interface Timeline Views," filed on Aug. 2, 2022, which is a continuation of U.S. patent application Ser. No. 17/123,031, entitled "Declaratively Defined User Interface Timeline Views," filed on Dec. 15, 2020 and issued as U.S. Pat. No. 11,403,119, which claims the benefit of priority to U.S. Provisional Patent Application No. 63/041,995, entitled "Declaratively Defined User Interface Timeline Views," filed on Jun. 21, 2020, the disclosure of each of which is hereby incorporated herein in its entirety.

TECHNICAL FIELD

The present description relates generally to user interfaces, including methods and systems for efficient rendering of user interface timeline views for display of dynamic application content.

BACKGROUND

Applications may provide information that is of interest to a user. However, to access that information, the user may need to launch an associated application, which may require time to locate a position of the application, wait for the application to launch, and navigate to a relevant section of the application that displays information of interest to the user. This process is inefficient for both user interaction time and device processing time. Accordingly, there is a need to provide streamlined access to application information in an efficient manner.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

To provide information from installed applications that can be viewed at a glance, operating systems may support displaying of user interfaces that show information from an associated application. For example, a user may wear a smart watch that allows the installation of complications that display information from respective associated applications. The applications may be installed directly on the smart watch or remotely on another device, such as a smart phone. The complications may therefore display information from an associated application without requiring the user to launch the associated application. While complications may improve productivity and ease of use, existing systems for supporting complications and other user interfaces for displaying application information may not be optimized for efficient implementation on mobile devices.

For example, complications may be permitted to execute arbitrary code with unbounded update frequency and execution time, negatively impacting device battery life, performance, and responsiveness. To manage complications and other user interfaces in an efficient and uniform manner while providing flexible user interface layouts, user interface timeline views may be provided by the rendering of hierarchical views. Data for display may be retrieved from an application extension to minimize waking of an associated application. The hierarchical views may be defined using one or more declarative definitions and/or procedural definitions. The hierarchical views may inherit globally defined properties, such as a display theme, to enable the rendered user interfaces to appear consistent with the display theme. By traversing the hierarchical views, user interface timeline views can be rendered in advance for future times by a background or daemon process. When the complication is displayed at a later time, one of the rendered user interfaces can be shown according to the current time, thereby providing a responsive user experience with low latency. Various policies for containers may be enforced with regard to update timing, update frequency, and rendering execution time to optimize resource usage.

Figure 1:
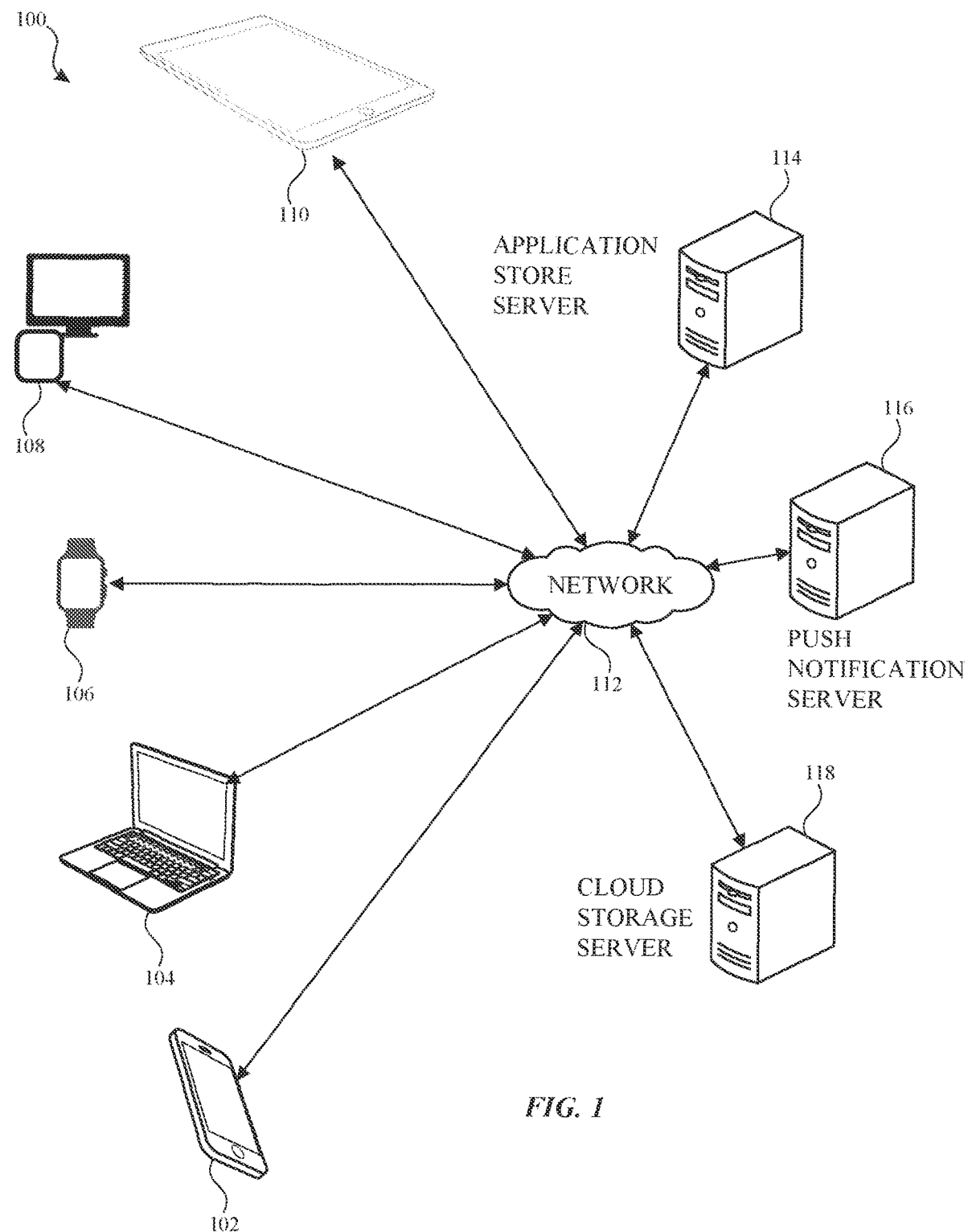
FIG. 1 illustrates an example network environment in which a system for providing efficient rendering of user interface timeline views for display of dynamic application content may be implemented, in accordance with one or more implementations.

FIG. 1 illustrates an example network environment in which a system for providing efficient rendering of user interface timeline views for display of dynamic application content may be implemented, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter "the electronic devices 102-110"), an application store server 114, a push notification server 116 and a cloud storage server 118 (hereinafter "the servers 114-118"), and a network 112. The network 112 may communicatively (directly or indirectly) couple, for example, any two or more of the electronic devices 102-110 and the servers 114-118. In one or more implementations, the network 112 may be an interconnected network of devices that may include, and/or may be communicatively coupled to, the Internet. In one or more implementations, the network 112 may correspond to a local area network (e.g., a WiFi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a tablet. By way of example, the electronic device 108 is depicted as a digital media player (e.g., configured to receive digital data such as music and/or video and stream it to a television or other video display). In one or more implementations, the electronic device 108 may be integrated into the display device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 8.

In one or more implementations, the application store server 114 may be configured to provide applications and associated data extensions and user interface timeline views for storage and execution on electronic devices 102-110. The electronic devices 102-110 may periodically query the application store server 114 for updated applications, data extensions, or containers for complications or other user interfaces. Updates from application store server 114 may also be pushed to electronic devices 102-110. The push notification server 116 may be configured to receive push notifications for third party applications, which may be pushed to electronic devices 102-110 when compliant with an update policy, as described further in FIG. 3. The cloud storage server 118 may be configured to store data (e.g., files such as documents and/or photos) associated with user accounts for download on user devices, to share and/or send data to other users, and/or to back-up (e.g., wirelessly) device data.

One or more of the servers 114-118 may be, and/or may include all or part of the electronic system discussed below with respect to FIG. 8. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers.

Figure 2:
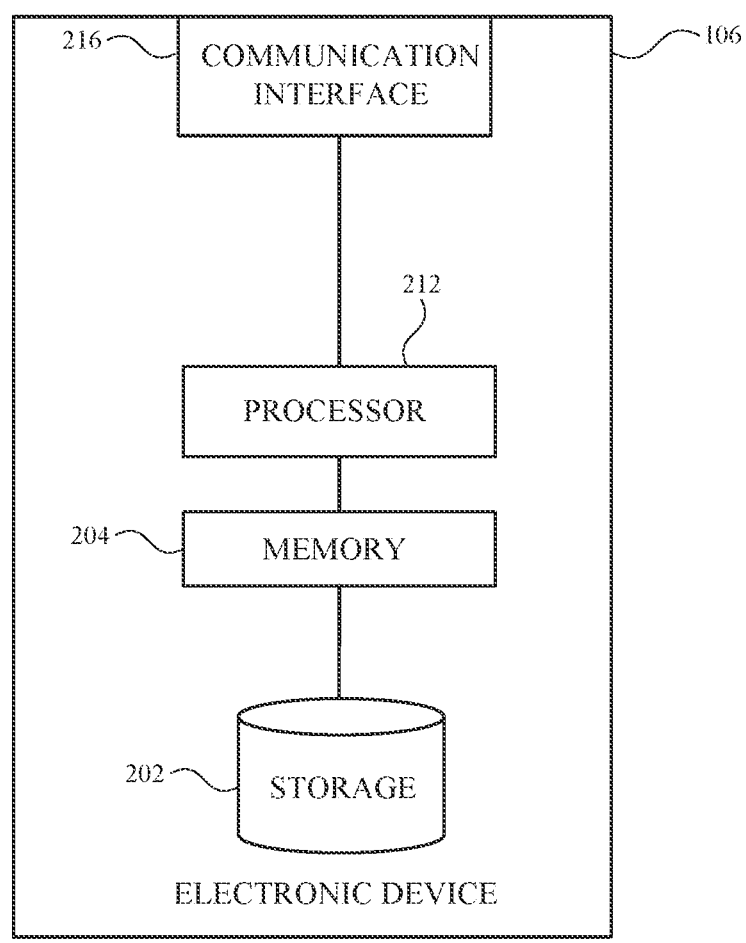
FIG. 2 illustrates a block diagram of an example electronic device, in accordance with one or more implementations.

FIG. 2 illustrates a block diagram of an example electronic device, in accordance with one or more implementations. For explanatory purposes, FIG. 2 is primarily described herein with reference to the electronic device 106 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 106 may include a storage 202, a memory 204, a processor 212, and a communication interface 216. The storage 202 may correspond to a first type of memory, such as a non-volatile memory, including flash storage such as NAND flash and/or magnetic storage. The memory 204 may correspond to a second type of memory, such as a volatile memory, including dynamic random-access memory (DRAM). The memory 204 may include suitable logic, circuitry, and/or code that enable storage of various types of information such as received data, generated data, code, and/or configuration information.

The processor 212 may include suitable logic, circuitry, and/or code that enable processing data and/or controlling operations of the electronic device 106. In this regard, the processor 212 may be enabled to provide control signals to various other components of the electronic device 106. The processor 212 may also control transfers of data between various portions of the electronic device 106, including storage 202 and memory 204. Additionally, the processor 212 may enable implementation of an operating system or otherwise execute code to manage operations of the electronic device 106. The processor 212 may include general purpose processors, graphics processing units (GPUs), and/or specialized processors.

In one or more implementations, the memory 204 may store one or more background processes for managing user interfaces, rendering user interface timeline views, and enforcing update policy. As described below with respect to FIG. 3, the background processes may generate future rendered views of user interface timeline views for complications or other user interfaces.

The communication interface 216 may include suitable logic, circuitry, and/or code that enables wired or wireless communication, such as between any of the electronic devices 102-110 and one of more of the servers 114-118 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 212, the storage 202, the memory 204, the communication interface 216, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
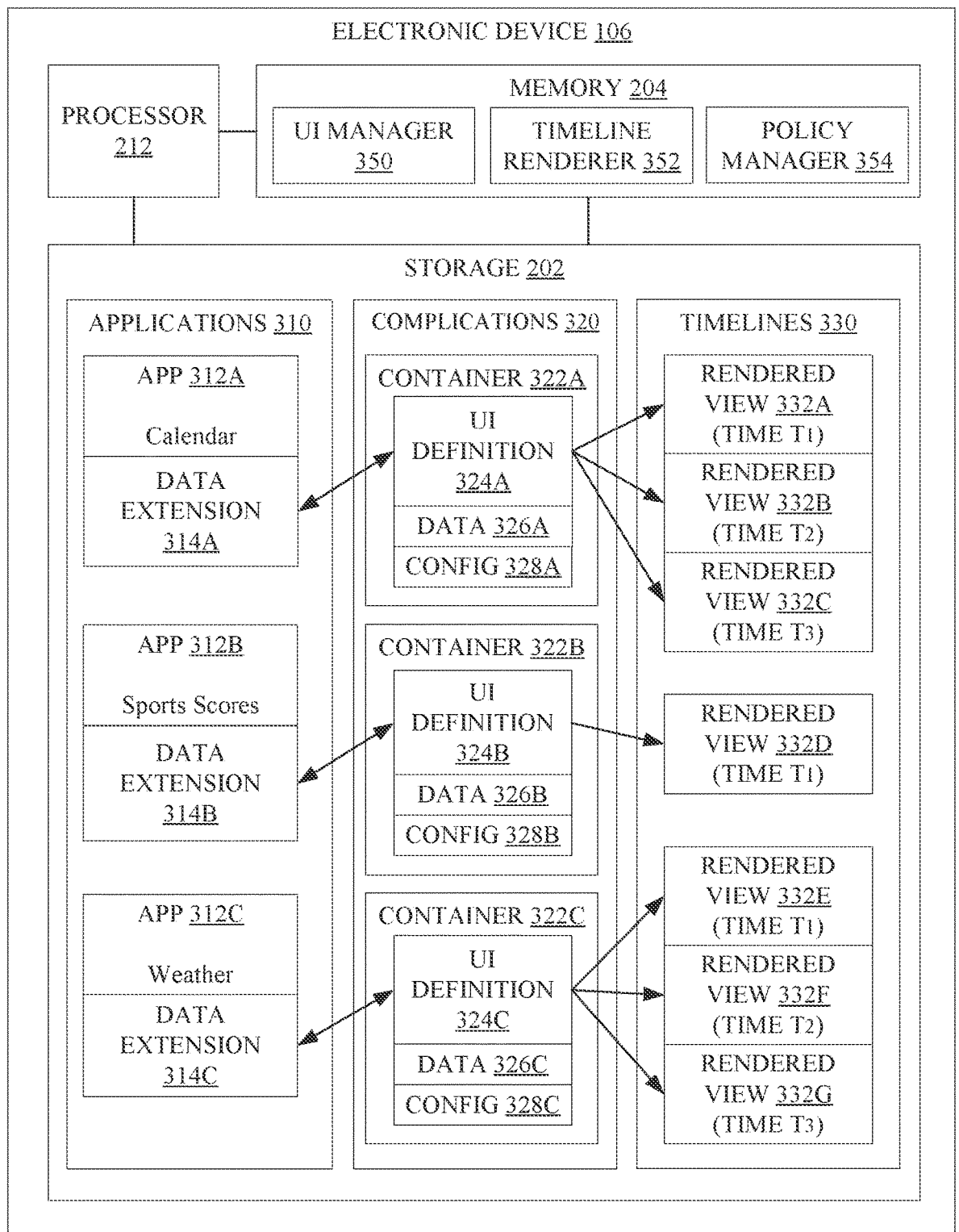
FIG. 3 illustrates a block diagram of an example electronic device executing background processes and storing applications, complications, and rendered timelines, in accordance with one or more implementations.

FIG. 3 illustrates a block diagram of an electronic device 106 for executing background processes and storing applications 310, complications 320, and timelines 330, in accordance with one or more implementations. As shown in FIG. 3, electronic device 106 may include storage 202, memory 204, and processor 212. Storage 202 may include applications 310, complications 320, and timelines 330. Applications 310 may include application 312A, application 312B, application 312C, data extension 314A, data extension 314B, and data extension 314C. Complications 320 may include container 322A, container 322B, and container 322C. Container 322A may include user interface (UI) definition 324A, data 326A, and config 328A. Container 322B may include user interface (UI) definition 324B, data 326B, and config 328B. Container 322C may include user interface (UI) definition 324C, data 326C, and config 328C. Timelines 330 may include rendered views 332A, 332B, 332C, 332D, 332E, 332F, and 332G. Memory 204 may include user interface (UI) manager 350, timeline renderer 352, and policy manager 354. Note that while the illustrated examples use complications 320 for a smart watch or electronic device 106, the described technology is broadly applicable to any user interface of electronic devices 102-110 showing dynamic data from an associated application.

As shown in FIG. 3, a number of applications 310 may be installed on electronic device 106, including application 312A corresponding to a calendar application, application 312B corresponding to a sports scores application, and application 312C corresponding to a weather application. The applications 310 may, for example, have been previously downloaded from application store server 114. Each application 312A-312C is also provided with a respective data extension 314A-314C. The data extensions 314A-314C may be lightweight data providers for application data that enable user interface timeline views to be updated without querying data directly from the associated application 312A-312C, thereby bypassing a computationally expensive waking or launching of application 312A-312C. While the applications 312A-312C are shown to be installed directly on electronic device 106, some of applications 312A-312C may be installed on a remote device, such as the electronic device 102. In this case, the data extensions 314A-314C on electronic device 106 may reach applications 312A-312C via communication with electronic device 102, for example via network 112, via an ad-hoc network, or via a direct wireless connection using near field communication, Bluetooth, or other radios.

User interfaces for displaying application data may be optionally provided for each of applications 310. Complications 320 may thus be provided to store user interface definitions for displaying data from each of applications 312A-312C in respective containers 322A-322C. For example, container 322A includes a user interface (UI) definition 324A, data 326A, and config 328A. Note that containers 322A-322C may be stored in a binary and/or compressed format for storage efficiency. UI definition 324A may define one or more declaratively defined user interfaces and/or one or more declaratively defined user interface elements for application 312A at respective times. UI definition 324A may be provided in a declarative syntax, for example by providing a user interface definition declaratively with respect to a current time. A declaratively defined user interface element that is defined by a UI definition 324 declaratively with respect to time, can then be interpreted to determine user interface definitions and render user interfaces for future times. The user interface elements in UI definition 324A may be defined in a tree or view hierarchy, in which each node in the tree represents a particular user interface element. Subtrees in the hierarchy may be defined declaratively and/or procedurally, as further discussed below in FIG. 4. By rendering the entire view hierarchy, a complete user interface may be provided. Thus, an array of view hierarchies can be provided to define user interfaces associated with respective future times.

As shown in FIG. 3, the UI definition 324A may query data extension 314A to retrieve and/or receive data to be shown by the corresponding user interfaces. For example, data extension 314A may provide user calendar entries previously entered into application 312A. Data 326A may include asset resources and placeholder content when, for example, data extension 314A is unavailable or is too costly to invoke, such as when an update budget is exceeded. For example, the placeholder content may correspond to an icon of the application. The placeholder content may also include sample offline data to be shown in a live preview when adding a complication. Config 328A may include configuration items that may include user adjustable settings such as complication size, complication type, and complication parameters. Container 322B and container 322C may contain elements similar to container 322A but for respective applications 312B and 312C.

Note that data extensions 314A-314C are separate from their respective applications 312A-312C. Accordingly, timeline renderer 352 can request dynamic data to be shown in user interface timeline views from data extensions 314A-314C, rather than querying applications 312A-312C directly. Thus, computationally expensive launching and querying of applications 312A-312C can be minimized, thereby providing a more efficient rendering. For example, when the applications 312A-312C are previously active, they may update a respective shared database or flat file that is accessible to the respective data extensions 314A-314C. The shared database or flat file may contain dynamic data that is likely to be used in future user interface renderings by timeline renderer 352.

In this manner, data extensions 314A-314C may minimize waking of the associated applications 312A-312C for improved computational efficiency. However, if the dynamic data necessary for rendering is unavailable in data extensions 314A-314C, then a waking of the associated application 312A-312C may be initiated if permitted by policy manager 354, for example if compliant with application update budgets. For example, an update budget for an application may include a limit on a number of updates in a given period of time (e.g., 50 updates per day), or a limit on usage of a resource such as a CPU, a GPU, an ASIC, memory or storage (e.g., a limit on CPU time, memory usage, or the like) for updates to user interfaces for the application within a given period of time. Further, if the associated application 312A-312C is already executing in the background, then the data extensions 314A-314C may opportunistically query the already executing application 312A-312C to update the shared database or flat file with new dynamic data, since the query does not trigger a computationally expensive wake or launch operation.

Policy manager 354 may determine when to update timelines 330 according to various update policies. Each of containers 322A-322C may request rendered views to be provided according to an update schedule, which may define, for example, desired update frequency, desired update time windows, and desired earliest start date and time for rendering. Policy manager 354 may attempt to service the update schedules for all containers on a best effort basis while enforcing update budgets.

For example, in some implementations, each container may be provided with a fixed periodic update budget that is periodically updated or reset, for example a budget of 50 updates that is reset daily. A normal rendering of a view according to a requested update schedule may consume a single update, whereas receiving a push notification, for example from push notification server 116, to render a new view may consume two updates. For example, when a new sports score is available, a score update may be pushed to data extension 314B via push notification server 116, which may have previously received the score update via a third party provider server associated with application 312B. Applications with largely static and predictable updates such as application 312A for calendar and application 312C for weather can request high frequency update schedules, as shown by the three rendered views 332A-332C for application 312A and 332E-332G for application 312C. Applications with less predictable updates such as application 312B for sports scores may request low frequency update schedules, as shown by the single rendered view 332D, thereby reserving update budget for push notifications. When a container exhausts its update budget, the container may continue showing the last rendered view, or placeholder content such as an application icon may be shown in place of future updates.

Since the updates may be provided on a best effort basis, policy manager 354 may use one or more policies to override or adjust the requested update schedules. For example, one policy may prioritize render updates for executing during idle time periods to avoid impacts to interface responsiveness and improve power management, such as when electronic device 106 is about to enter into a standby mode. Another policy may prioritize coalescing updates from multiple containers to minimize updating overhead. Yet another policy may measure a first render time of a container for budget estimation purposes. For example, consumption of the update budget for the application may be scaled according to a previously measured first render time to determine a rendering cost for that update. For example, the rendering cost for updating a user interface element may include a previously measured rendering time for the user interface element and/or a previously measured memory usage for updating the user interface element. For declaratively defined user interface elements that are defined for one or more respective times, the rendering cost may include a (e.g., estimated or previously measured) cost of interpreting the at least one declaratively defined user interface element for each of the respective times. To accommodate the various policies for efficient rendering, policy manager 354 may defer or adjust the timing of the requested scheduled updates for complications 320.

Policy manager 354 may also deny requested updates, for example if a previously measured rendering cost, such as the previously measured first render time or a previously measured memory usage for previous updates, exceeds a threshold for a resource over a given period of time, such as a CPU processing time limit, a GPU processing time limit, an ASIC processing time limit, a memory usage limit, and/or a storage footprint limit. Policy manager 354 may also deny updates on a per group basis. For example, if any single container update for several containers in a group update exceeds a threshold for a given period of time, then the remaining container updates in the group may be denied updates for the given period of time. As another example, updates for a group may be denied when a group rendering cost that includes rendering costs for a plurality of data structures exceeds an update budget for the group or exceeds a threshold for a resource. This may help to avoid processing stalls while still allowing policy manager 354 to spread out update processing according to application update budgets and available resources.

In this manner, policy manager 354 may use timeline renderer 352 to efficiently render user interface timeline views in advance of displaying complications. This enables electronic device 106 to minimize on-demand rendering of user interface timeline views immediately prior to display, which may introduce high latency and inefficient use of available processing resources. Further, since the user interface timeline views may be defined in containers using a unified and standardized format, management and development of user interface timeline views is highly facilitated.

Policy manager 354 may invoke timeline renderer 352 to render one or more rendered views into timelines 330 in accordance with requested update schedules, update budgets, and update policies, as discussed above. For example, a specific number of view hierarchies may be traversed and rendered to provide a corresponding number of rendered views. In the example shown in FIG. 3, three view hierarchies are rendered for each of UI definition 324A and 324C, whereas one view hierarchy is rendered for UI definition 324B. Timeline renderer 352 may accordingly render one or more rendered views of user interface timeline views for associated future timestamps, which may also define time ranges. For example, referring to container 322A, timeline renderer 352 may use UI definition 324A and data 326A, which may query data extension 314A using config 328A, to generate the rendered view 332A corresponding to time $T_1$, the rendered view 332B corresponding to time $T_2$, and the rendered view 332C corresponding to time $T_3$. Similarly, timeline renderer 352 may generate rendered view 332D for container 322B and rendered views 332E-332G for container 322C.

Times $T_1$, $T_2$, and $T_3$ may correspond to successive future timestamps after the rendering. In some implementations, the associated timestamp for each rendered view may correspond to an earliest valid time range. Thus, rendered view 332A may be valid from time $T_1$ up until time $T_2$, at which point rendered view 332A may no longer be valid since rendered view 332B is available. Rendered view 332B may be valid from time $T_2$ up until time $T_3$, and rendered view 332C may be valid from time $T_3$ onwards until a new rendered view with a newer timestamp is available. When rendered views expire and are no longer valid for a current time, the expired rendered views may be marked for removal from timelines 330, for example by a garbage collection process.

UI manager 350 may be part of an operating system of electronic device 106, and may manage presentation of watch faces, complications, and/or other user interfaces. Accordingly, UI manager 350 may determine whether a particular container 322A-322C is displayed, and if so, further determine a particular rendered view from timelines 330 to show based on the current time, as described in further detail below in FIG. 6. If a rendered view that is valid for the current time is unavailable, then the latest rendered view may be shown, or placeholder content may be shown, or a new rendered view may be generated on demand if the rendering is approved by policy manager 354.

Figure 4:
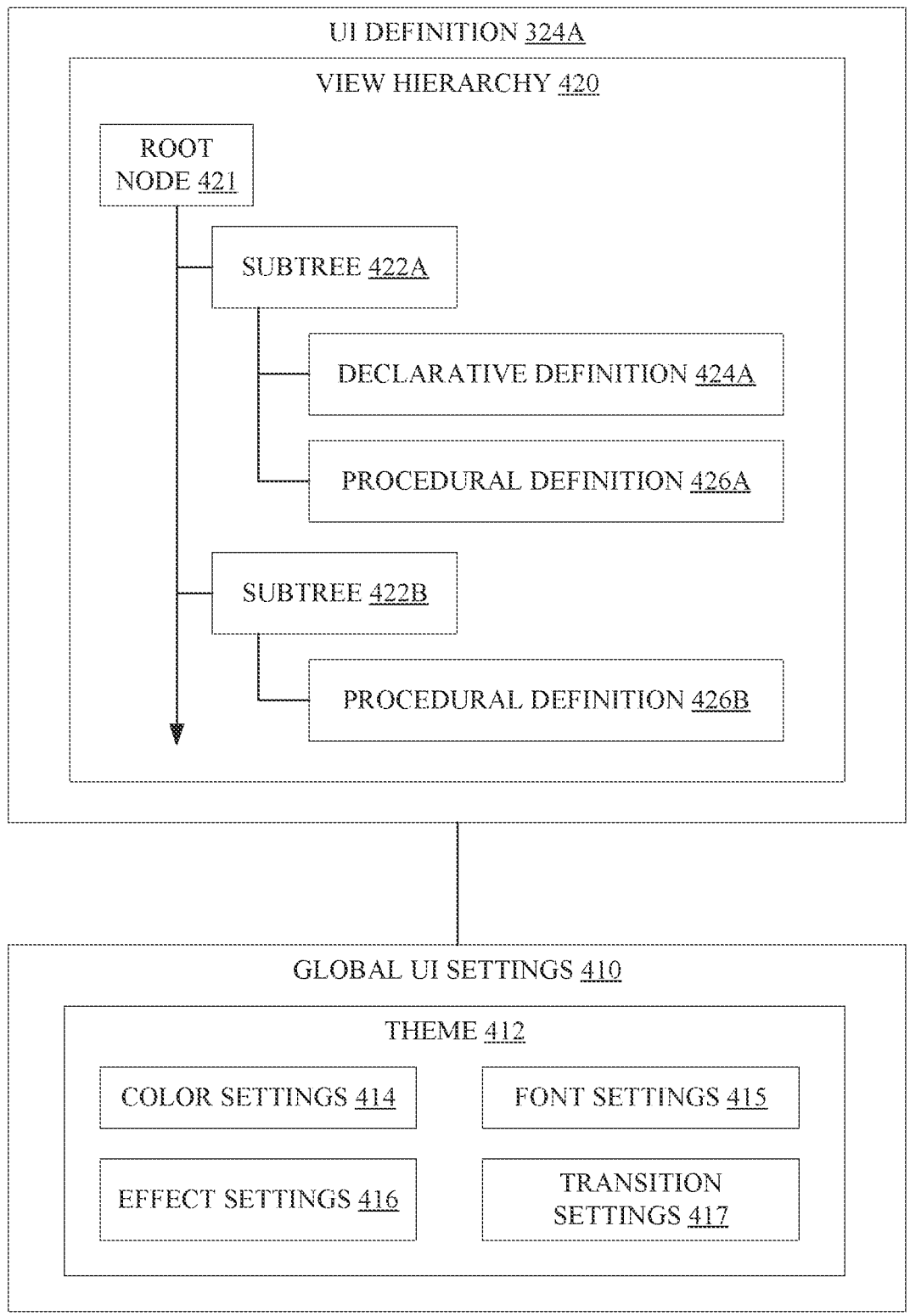
FIG. 4 illustrates a block diagram of an example user interface definition defined as a view hierarchy data structure, in accordance with one or more implementations.

FIG. 4 illustrates a block diagram of an example user interface definition 324A defined as a view hierarchy 420, in accordance with one or more implementations. View hierarchy 420 includes root node 421, subtree 422A, and subtree 422B. Subtree 422A includes declarative definition 424A for a declaratively defined user interface and procedural definition 426A for a procedurally defined user interface. Subtree 422B includes procedural definition 426B. Global user interface (UI) settings 410 includes color settings 414, font settings 415, effect settings 416, and transition settings 417.

View hierarchy 420 may be organized as a tree of nodes, each node corresponding to a user interface element or layer. The number and content of the nodes shown in view hierarchy 420 are exemplary, and any number and arrangement of nodes is possible. Root node 421 may correspond to the top node of the tree. Subtrees may be defined using declarative and/or procedural definitions. For example, procedural definitions may correspond to templates that explicitly define user interfaces with respect to time using text, images, and various parameters selected from predefined choices. On the other hand, as discussed above, declarative definitions may provide a user interface definition with respect to a current time, which is then interpreted to determine user interface definitions for future times. As shown in subtree 422A, both a declarative definition 424A and a procedural definition 426A are provided. Some devices may not support interpretation of declarative definitions, in which case procedural definition 426A may function as a fall-back definition for declarative definition 424A. Thus, when declarative definitions are provided, it may be preferable to include a procedural definition for wider device compatibility. Some user interface elements may be more readily defined in a procedural syntax due to template format simplicity and/or developer familiarity, and thus the view hierarchy 420 can be flexibly defined using either declarative or procedural syntaxes.

However, declarative syntax may be preferred for several reasons. For example, declarative definition 424A may define one or more declaratively defined user interface elements that allow for dynamic placement of user interface elements anywhere (e.g., at dynamic locations) within a display canvas, whereas the templates in procedural definition 426A may be limited to certain preconfigured layouts. For example, a declaratively defined user interface element may specify a dynamic location within the display canvas for display of the declaratively defined user interface element. For example, a dynamic location may be a location that is adjustable, within the display canvas, in response to current conditions of the display and/or the device (e.g., to accommodate concurrent display of other user interface elements within the display canvas, and/or to conform to a theme for the display canvas). A display canvas may be an area of a device display that is configured for display of user interface elements and/or other display content. The display canvas may be defined by the physical boundaries of the display or by a user-defined, application-defined, or system-defined boundary that defines a portion of the physical display. In addition, declarative definition 424A may specify declaratively defined UI elements that are difficult or impossible to specify in procedural definition 426A, such as UI elements with multiple or continuous per second updates to the visual appearance of the UI element for smooth visual appearance of the UI element, and (e.g., long) animations, over time, of one or more visual elements of the UI element, such as slow pulsating dots, weather effects, or other visual elements.

Declarative definition 424A may also allow for property inheritance for visual consistency of declaratively defined user interface elements. For example, declarative definition 424A may specify using inherited properties such as default properties, for various visual properties of a declaratively defined user interface element. The inherited properties of a declaratively defined user interface element may include inherited colors (e.g., a default color setting), inherited fonts (e.g., a default font setting), inherited effects (e.g., a default effect setting), and/or inherited transitions (e.g., a default transition setting). For example, declarative definition 424A may specify one or more inherited properties that cause a declaratively defined user interface element to inherit global user interface (UI) settings 410, which may include a currently selected theme, or theme 412, defining color settings 414, font settings 415, effect settings 416, and/or transition settings 417. For example, color settings 414 may define a color scheme for various UI layers such as foreground, background, text colors, tint, saturation, etc. Font settings 415 may define text fonts and emphasis (e.g. italics, bold, underline) to be used for different UI elements. Effect settings 416 may define effects in response to user interactions such as touch interactions. Transition settings 417 may define how user interface elements transition, such as by defining fade ins/outs, swipe animations, etc. Thus, in one or more implementations, a declaratively defined user interface element may include one or more inherited properties such as one or more of: a default color setting (e.g., inherited from color settings 414), a default font setting (e.g., inherited from font settings 415), a default effect setting (e.g., inherited from effect settings 416), and a default transition setting (e.g., inherited from transition settings 417).

When a declaratively defined user interface element includes inherited properties, a change in the inherited properties may trigger a purge of any previously rendered views of the declaratively defined user interface element. For example, if the user changes theme 412, then the previously rendered views using a prior theme may be invalidated, and policy manager 354 may cause a new set of rendered views to be generated when permitted by update budgets and policies.

Figure 5:
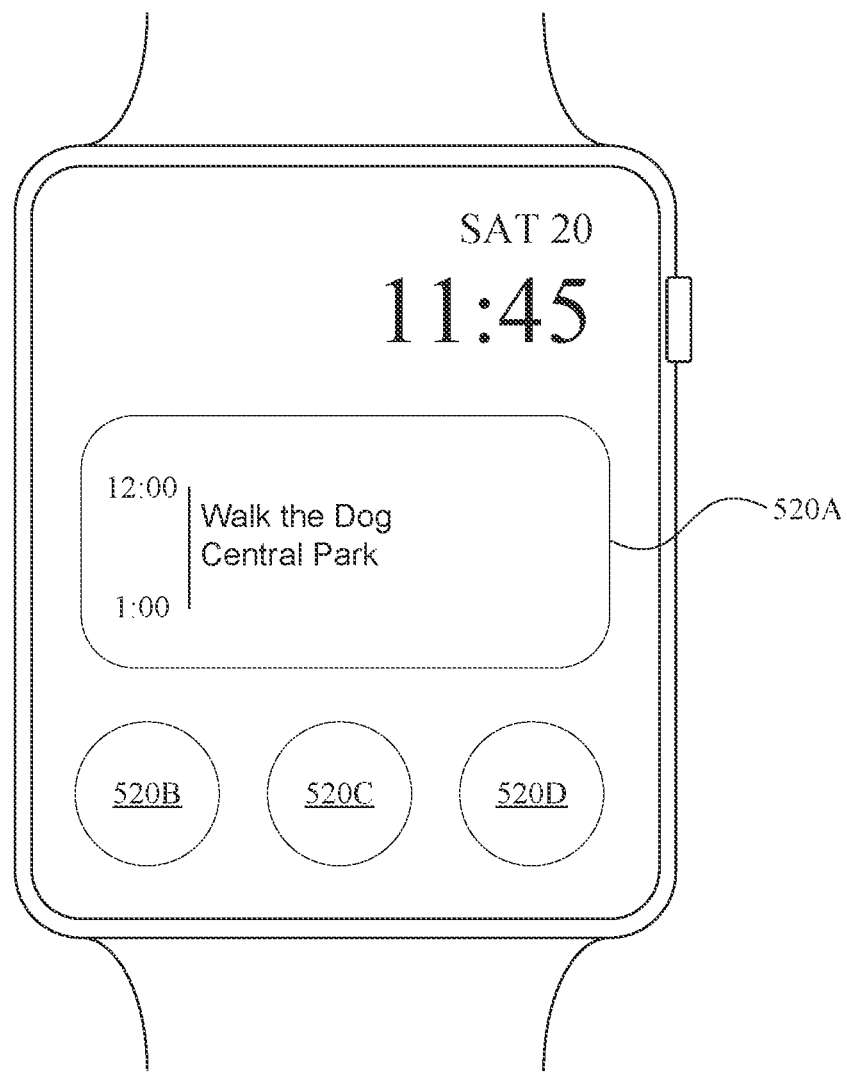
FIG. 5 illustrates an example display with complications for displaying user interface timeline views, in accordance with one or more implementations.

FIG. 5 illustrates an example display with complications for displaying user interface timeline views, in accordance with one or more implementations. For example, if the user decides to add container 322A corresponding to a complication for calendar information, then a display of electronic device 106 may appear similar to FIG. 5, in which complications 520A, 520B, 520C, and 520D are shown, and complication 520A (e.g., a declaratively defined user interface element) corresponds to container 322A (e.g., and is defined by a declarative definition such as declarative definition 424A in a UI definition such as UI definition 324A). As shown in FIG. 5, complications 520A-520D may be presented in various shapes and sizes. When view hierarchy 420 does not specifically define different user interfaces for different canvas sizes, content may be automatically scaled and reflowed to adjust to the canvas size of the complication. Alternatively, view hierarchy 420 may explicitly define different user interfaces according to canvas size ranges, for example by providing a greater amount of information with larger canvas sizes.

Further, when adding complications, the user may adjust various user defined properties and parameters. For example, for a weather complication, the user may select a detailed view for a specific item of interest, such as weather for a particular city, or a general view, such as weather for several cities. Selection data for the parameters may be retrieved from the associated data extension. For example, in the context of the weather complication or container 322C, data extension 314C may be queried for selectable cities to display weather, which may be selectable using, for example, a text search entry box and/or a drop down selector menu. Thus, by adjusting the parameters in this manner, the user may also add multiple instances of the same complication with different parameters, for example to track detailed weather from different cities. Each complication that is added and configured may be stored in a respective container within complications 320. Further, UI manager 350 may also maintain the screen positioning for each container within complications 320.

Besides displaying the user interface timeline views, UI manager 350 may also support interaction with the user interface timeline views. For example, portions of the user interface timeline views may be defined to launch into a corresponding section of the associated application in response to a user interaction. For example, tapping on a declaratively defined user interface element such as complication 520A may cause electronic device 102 to launch application 312A, or the calendar application, and further navigate directly to the displayed 12:00-1:00 calendar entry. Interactive regions of the declaratively defined user interfaces may therefore be defined in UI definition 324A to access a respective Universal Resource Indicator (URI), which may launch into an associated portion of application 312A.

Figure 6:
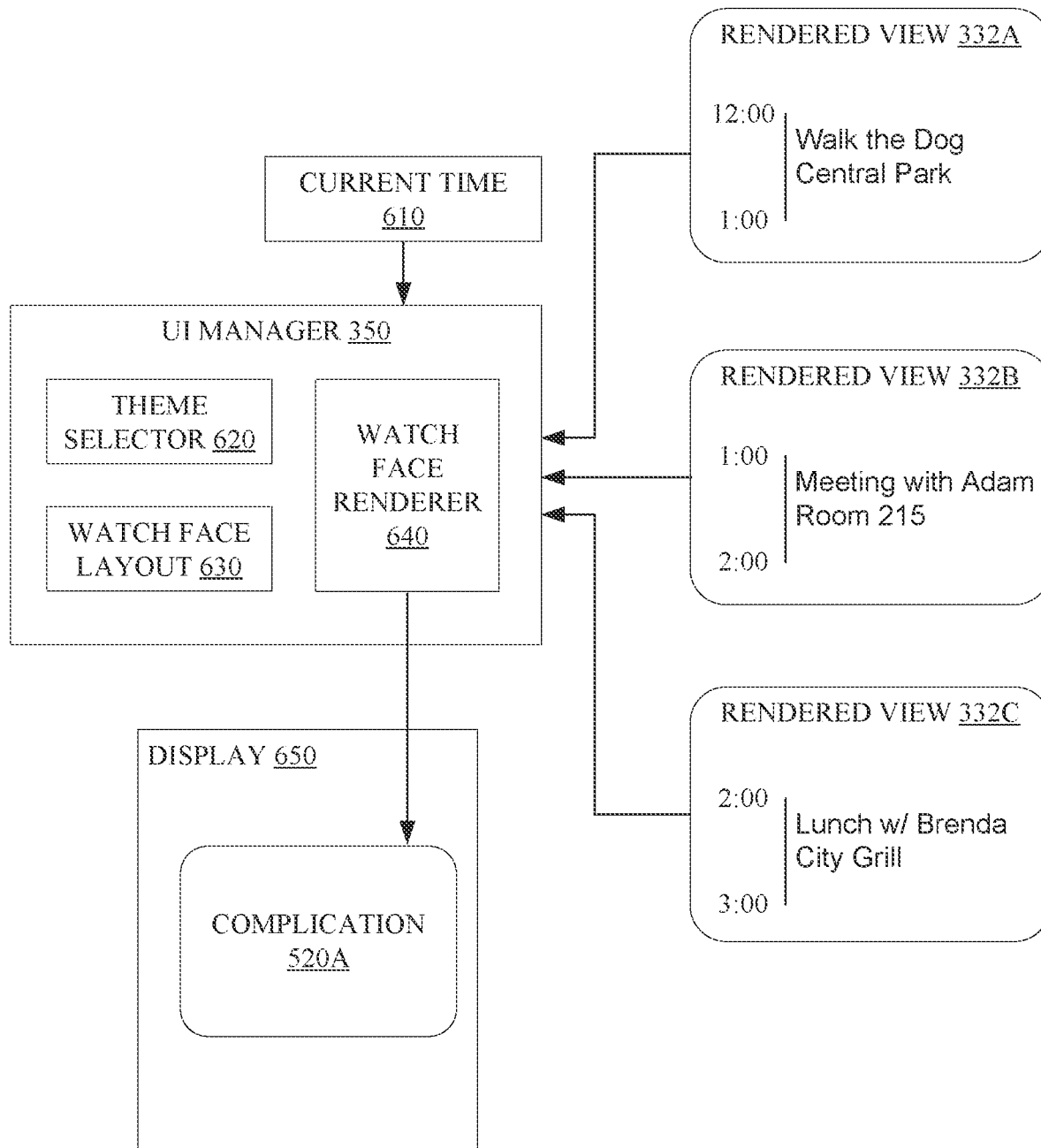
FIG. 6 illustrates a block diagram for selecting a rendered user interface for display in a complication, in accordance with one or more implementations.

FIG. 6 illustrates a block diagram for selecting a rendered user interface for display in a complication, in accordance with one or more implementations. UI manager 350 may determine that a declaratively defined user interface such as complication 520A is currently displayed on display 650, for example by determining that watch face layout 630 defines container 322A as being positioned at complication 520A.

UI manager 350 may then determine the current time 610 and select a rendered view from rendered views 332A-332C of the declaratively defined user interface that corresponds to the current time 610. For example, rendered views 332A-332C of the declaratively defined user interface may have been previously generated at 4:00 AM, and it may be preferable to show the calendar entry for the next calendar event at least 30 minutes in advance. In this case, rendered view 332A may correspond to time $T_1$ at 4:01 AM, rendered view 332B may correspond to time $T_2$ at 12:30 PM, and rendered view 332C may correspond to time $T_3$ at 1:30 PM. Based on the current time 610, a rendered view may be selected accordingly. For example, if the current time 610 indicates 11:00 PM, then rendered view 332A may be selected. If the current time 610 indicates 1:40 PM, then rendered view 332C may be selected. Thus, the rendered view with the latest timestamp that is still valid for the current time 610 may be preferred for selection. As discussed above, the timestamps for each rendered view may define an earliest valid time range.

Once a rendered view of the declaratively defined user interface is selected, then watch face renderer 640 may display the selected rendered view in complication 520A when rendering the watch face. For example, if UI manager 350 selects rendered view 332C, then rendered view 332C may be shown within complication 520A. While display 650 only indicates complication 520A for simplicity, it should be understood that display 650 may also include other complications indicated in watch face layout 630 to display an interface as shown in FIG. 5.

Further, as discussed above, when theme selector 620 is used to change the current theme, e.g. theme 412, then the timelines 330 of the declaratively defined user interface may be invalidated and new rendered views may be generated according to policy manager 354. In some embodiments, the rendered views may be an intermediate representation that can be quickly rendered by watch face renderer 640 to dynamically adjust to global UI settings 410. In this case, the timelines 330 may not need to be invalidated since the intermediate representation is still valid even after changing theme 412.

Figure 7:
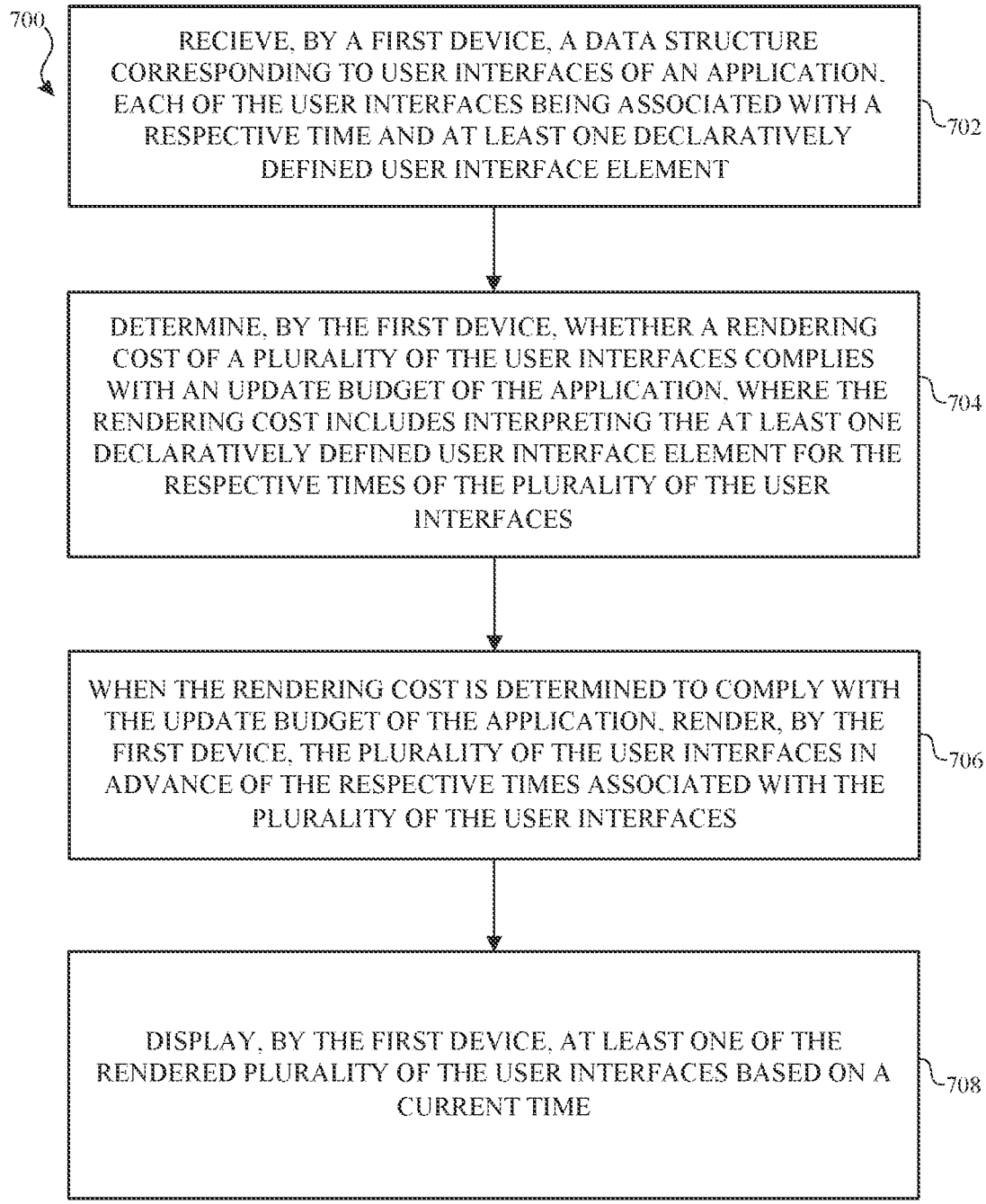
FIG. 7 illustrates a flow diagram of an example process for providing efficient rendering of user interface timeline views for display of dynamic application content, in accordance with one or more implementations.

FIG. 7 illustrates a flow diagram of an example process 700 including blocks 702, 704, 706, and 708 for providing efficient rendering of user interface timeline views for display of dynamic application content, in accordance with one or more implementations. For explanatory purposes, the process 700 is primarily described herein with reference to the electronic devices 102, 104, 106, 108 and 110 of FIG. 1. However, the process 700 is not limited to the electronic devices 102, 104, 106, 108 and 110, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, the electronic device 106 retrieves and/or receives a data structure corresponding to user interfaces of an application, each of the user interfaces being associated with a respective time and at least one declaratively defined user interface element (e.g., complication 520A). Referring to FIG. 3 and FIG. 4, this may correspond to electronic device 106 retrieving container 322A corresponding to user interfaces of application 312A, in which UI definition 324A describes a rendered view 332A, 332B, and 332C of application 312A associated with respective times $T_1$, $T_2$, and $T_3$, and the rendered views 332A-332C are associated with declarative definition 424A of a declaratively defined user interface element, such as complication 520A. The UI definition 324A may reference an extension associated with application 312A, or data extension 314A, to obtain dynamic data for display in the rendered views 332A-332C.

The electronic device 106 determines whether a rendering cost of a plurality of the user interfaces complies with (e.g., does not exceed) an update budget of the application, the rendering cost including a cost of interpreting the at least one declaratively defined user interface element for the respective times of the plurality of the user interfaces (704). Referring to FIG. 3 and FIG. 4, this may correspond to policy manager 354 determining whether a rendering cost of container 322A complies with (e.g., does not exceed) an update budget of application 312A, the rendering cost including a cost of interpreting declarative definition 424A. As discussed above, policy manager 354 may consider various factors for whether the rendering cost is compliant with (e.g., does not exceed) an update budget, including a previously measured rendering time. For example, in one or more implementations, determining whether a rendering cost of a plurality of the user interfaces complies with (e.g., does not exceed) an update budget of an application may include determining whether a number of updates performed for user interfaces associated with the application over a preceding period of time exceeds a number of allowed updates for the application over the preceding period of time. As another example, determining whether a rendering cost of a plurality of the user interfaces complies with (e.g., does not exceed) an update budget of the application may include determining whether an amount of CPU time for rendering a plurality of user interfaces exceeds a limit on the CPU time for an update for the application. As another example, determining whether a rendering cost of a plurality of the user interfaces complies with (e.g., does not exceed) an update budget of the application may include determining whether a storage footprint for rendering a plurality of user interfaces exceeds a limit on the size of a storage footprint for an update for the application.

When the rendering cost is determined to comply with the update budget of the application, the electronic device 106 renders the plurality of the user interfaces in advance of the respective times associated with the plurality of the user interfaces (706). Referring to FIG. 3, this may correspond to timeline renderer 352 rendering, based at least on UI definition 324A, the rendered views 332A, 332B, and 332C in advance of the associated respective times $T_1$ (4:01 AM), $T_2$ (12:30 PM), and $T_3$ (1:30 PM). For example, as discussed above, policy manager 354 may determine a time for rendering the rendered views 332A-332C according to requested update schedules, update budgets, power management, and other factors. For example, the determined time may correspond to 4:00 am, and the electronic device 106 may be in an idle state.

The electronic device 106 displays at least one of the rendered plurality of the user interfaces based on a current time (708). Referring to FIG. 6, this may correspond to watch face renderer 640 selecting from rendered view 332A, 332B, or 332C for display in complication 520A of display 650, where the respective time $T_1$ (4:01 AM), $T_2$ (12:30 PM), or $T_3$ (1:30 PM) corresponds to the current time 610. As discussed above, this may be determined by using the timestamps of the rendered views 332A-332C as defining an earliest valid time range, where the most recent rendered view that is still valid for current time 610 is preferred for selection. The resulting view of display 650 may appear similar to FIG. 5.

The subject technology provides for methods and systems for efficient rendering of user interface timeline views for display of dynamic application content. The user interfaces may be provided by the rendering of hierarchical views. Data for display may be retrieved from an application extension to minimize waking of an associated application. The hierarchical views may be defined using one or more declarative definitions and/or procedural definitions. Procedural definitions may also function as a fallback when interpretation of declarative definitions is not supported in a particular device environment. The hierarchical views may inherit globally defined properties, such as a display theme, to enable the rendered user interfaces to appear consistent with the display theme. By traversing the hierarchical views, user interface timeline views can be rendered in advance for future times by a background or daemon process. When the user interfaces associated with an application are to be shown on a display, one of the rendered user interfaces can be shown according to the current time, thereby providing a responsive user experience with low latency.

Various policies for timeline views may be enforced with regard to rendering update timing, rendering update frequency, and rendering execution time to optimize resource usage. In some implementations, actual render times from previous renders may be measured to assist in estimating render time for policy management. In this manner, user interface timeline views can be efficiently supported for display of dynamic application content.

According to various implementations, a method for efficient rendering of user interface timeline views for display of dynamic application content is provided. The method may include retrieving, by a first device, a data structure corresponding to user interfaces of an application, each of the user interfaces being associated with a respective time and at least one declaratively defined user interface element. The method may include determining, by the first device, whether a rendering cost of a plurality of the user interfaces complies with an update budget of the application, the rendering cost including interpreting the at least one declaratively defined user interface element for the respective times of the plurality of the user interfaces. When the rendering cost is determined to comply with the update budget of the application, the method may include rendering, by the first device, the plurality of the user interfaces in advance of the respective times associated with the plurality of the user interfaces. The method may include displaying, by the first device, at least one of the rendered plurality of the user interfaces based on a current time.

Other aspects include corresponding systems, apparatuses, and computer program products for implementation of the computer-implemented method.

As described above, one aspect of the present technology is the gathering and use of data available from specific and legitimate sources for displaying user interface timeline views. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for recognizing a spoken command. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting media content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
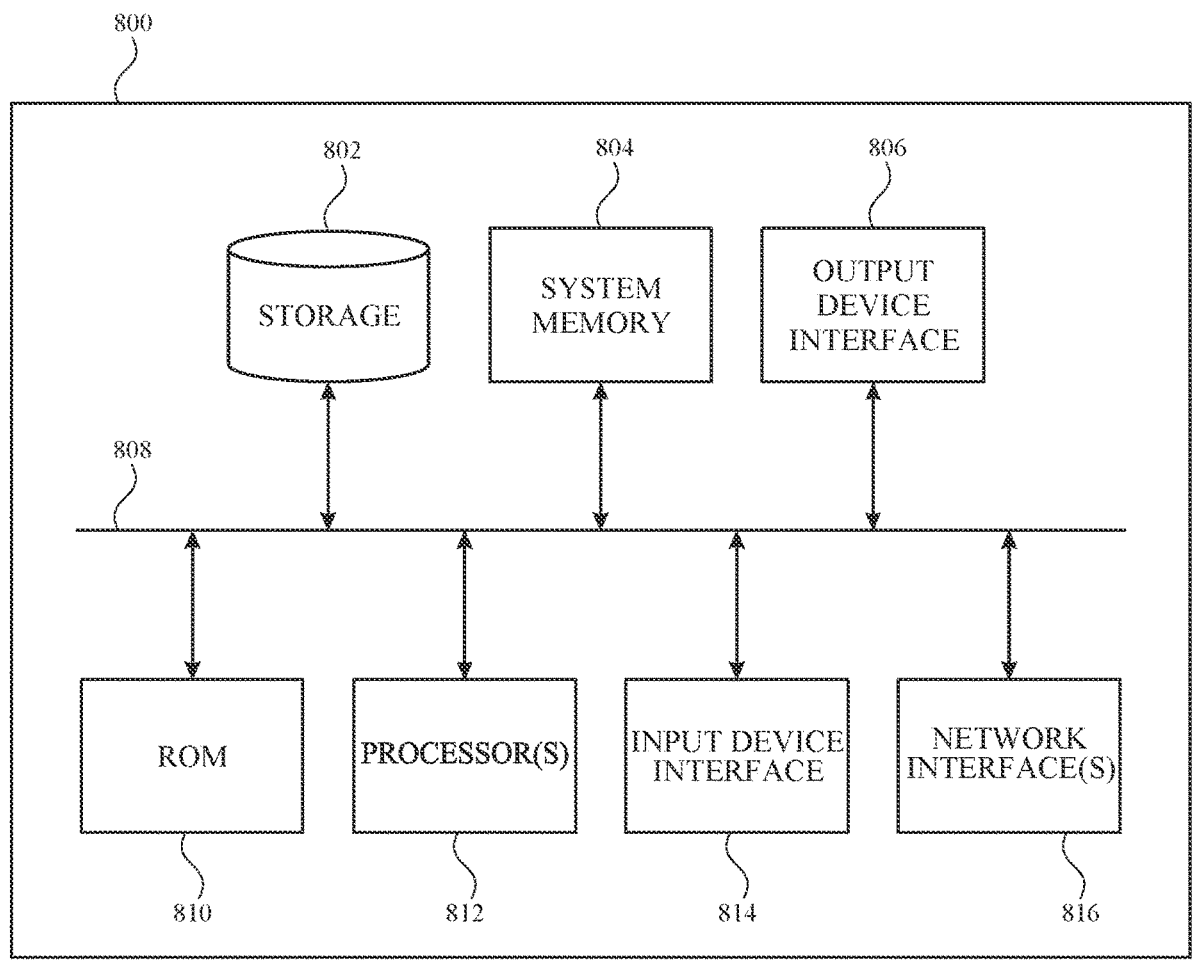
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-110, and/or one or the servers 114-118 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as one or more of the servers 114-118 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining, by a device, a declarative definition of a dynamic user interface associated with an application, wherein the declarative definition comprises a view hierarchy of one or more user interface elements of the dynamic user interface; and
    displaying, by the device based on the declarative definition and without waking the application, the dynamic user interface.

2. The method of claim 1, wherein the dynamic user interface comprises a dynamic complication.

3. The method of claim 1, wherein displaying the dynamic user interface comprises dynamically determining, based on the declarative definition and without waking the application, a location of the dynamic user interface on a display.

4. The method of claim 1, wherein displaying the dynamic user interface comprises displaying, without waking the application, multiple updates to a visual appearance of the dynamic user interface over time.

5. The method of claim 1, wherein displaying the dynamic user interface comprises:
    obtaining, without waking the application, dynamic data for the dynamic user interface; and
    updating the dynamic user interface using the dynamic data.

6. The method of claim 1, wherein displaying the dynamic user interface comprises adjusting, without waking the application, the dynamic user interface in response to a current condition of a display of the device.

7. The method of claim 1, wherein displaying the dynamic user interface comprises adjusting, without waking the application, the dynamic user interface in response to a current condition of the device.

8. The method of claim 1, wherein displaying the dynamic user interface comprises displaying, without waking the application, the dynamic user interface with at least one inherited feature from a global user interface setting.

9. The method of claim 8, wherein the global user interface setting comprises at least one of: a theme, a color, a font, or an effect.

10. The method of claim 1, wherein displaying the dynamic user interface comprises displaying, without waking the application, a transition of the dynamic user interface based on the declarative definition.

11. The method of claim 10, wherein the transition comprises a fade transition or an animation of the dynamic user interface.

12. A non-transitory machine-readable medium storing instructions which, when executed by one or more processors, cause the one or more processors to perform operations comprising:
    obtaining, by a device, a declarative definition of a dynamic complication associated with an application, wherein the declarative definition comprises a view hierarchy of one or more user interface elements of the dynamic complication; and
    displaying, by the device based on the declarative definition and without waking the application, the dynamic complication.

13. The non-transitory machine-readable medium of claim 12, wherein displaying the dynamic complication comprises dynamically determining, based on the declarative definition, a location of the dynamic complication on a display.

14. The non-transitory machine-readable medium of claim 12, wherein displaying the dynamic complication comprises displaying, without waking the application, multiple updates to a visual appearance of the dynamic complication over time.

15. The non-transitory machine-readable medium of claim 12, wherein displaying the dynamic complication comprises:
    obtaining, without waking the application, dynamic data for the dynamic complication; and
    updating the dynamic complication using the dynamic data.

16. The non-transitory machine-readable medium of claim 12, wherein displaying the dynamic complication comprises adjusting the dynamic complication in response to a current condition of a display of the device.

17. The non-transitory machine-readable medium of claim 12, wherein displaying the dynamic complication comprises adjusting the dynamic complication in response to a current condition of the device.

18. The non-transitory machine-readable medium of claim 12, wherein displaying the dynamic complication comprises displaying the dynamic complication with at least one inherited feature from a global user interface setting.

19. The non-transitory machine-readable medium of claim 12, wherein displaying the dynamic complication comprises displaying a transition of the dynamic complication based on the declarative definition.

20. A device, comprising:
a memory; and
one or more processors configured to:
- obtain a declarative definition of a dynamic complication associated with an application at the device, wherein the declarative definition comprises a view hierarchy of one or more user interface elements of the dynamic complication; and
- display, based on the declarative definition and without waking the application, the dynamic complication.

* * * * *